3,464,850
FIBROUS ORGANIC MATERIAL BONDED WITH A BLOCK COPOLYMER
Walter R. Haefele, Orinda, Calif., assignor to Shell Oil Company, New York, N.Y., a corporation of Delaware
No Drawing. Filed Apr. 25, 1966, Ser. No. 544,689
Int. Cl. C03c *13/00;* C09d *3/48*
U.S. Cl. 117—135.5        3 Claims

ABSTRACT OF THE DISCLOSURE

New articles of manufacture are disclosed comprising a fibrous organic material bearing a minor amount of (1) a block copolymer having the general configuration A—B—A wherein each A is a polymer block of a monovinyl arene and B is a polymer block of a conjugated diene, or (2) hydrogenated derivatives of said block copolymer. The new products have improved properties, e.g., abrasion resistance. The block copolymer is applied either from solution or as a melt.

---

This invention relates to improvements in the abrasion resistance of fibrous organic materials and to a process for their preparation as well as articles prepared from the same.

In certain articles designed to withstand considerable stresses in use, certain textile materials are often impregnated or coated with rubber or rubber like materials to improve their abrasion resistance, flex characteristics, water repellence, and the like. Typical articles prepared from such combinations include hose, belts, tires, rope, webbing, fibers to be used as tire cord, yarns, bats, woven or non-woven fabrics, carpeting and laminates. In such articles it is not only important to improve flexibility and abrasion resistance but also to insure that any plies of the fibrous organic material with another material such as an adjacent thermoplastic or rubber layer is firmly adhered and remains so even after the article has been subjected to repeated and varied strains in use, since any separation and relative movement of components of the assembly may lead to abrasion between these parts and consequent early failure.

The impregnation and coating of textiles and the like with elastic materials normally involves a vulcanizing step in order to promote the maximum physical properties of the rubber. Such impregnation or coating may be for a number of different purposes such as improving the abrasion resistance of a textile or other fibrous body, improving the bond strength between the fiber or textile and adjacent material, or promoting water resistance. A case in point where all of these aspects come into play is in the formation of canvas top footwear such as "tennis" shoes. In this instance it is necessary for the canvas upper to be firmly bonded to a thermoplastic or elastomeric sole portion of the shoe. At the same time, it is highly desirable to increase the abrasion resistance of the canvas to improve the life of the article and it is also highly desirable to increase the water shedding properties of the shoe during the life of the article. With the rubbers requiring vulcanizaiton, two shortcomings are especially detrimental: while impregnation of textiles is possible, this results in closing the pores thereof and, secondly, the bond strength to other rubbers, e.g., soling, is too low to be satisfactory.

Sport shoes such as canvas topped footwear must be marketed under highly competitive conditions; consequently, any economies which may be effected in the manufacture of the articles improve the competitive position thereof. The necessity for vulcanizing reduces this competitive position and consequently it would be highly desirable to avoid vulcanizing if maximum physical properties may be achieved by other means.

It is an object of the present invention to improve the physical properties of fibrous organic materials. It is a particular object of the invention to impregnate or coat fibrous organic materials such as cord or textiles. Particular objects of the invention include the improvement in abrasion resistance, bond strengths, and water repellence of textiles and like materials. Other objects will become apparent during the following detailed description of the invention.

Now, in accordance with the present invention, new articles of manufacture are provided comprising a fibrous organic material bearing a minor amount, sufficient to improve the abrasion resistance and bonding strength thereof, of a block copolymer of the group consisting of block copolymers having the general configuration

A—B—A wherein each A is a polymer block of a monovinyl arene and B is a polymer block of a conjugated diene, each block A having an average molecular weight between about 8,000 and about 45,000 and block B having an average molecular weight between about 25,000 and about 150,000, the proportion of monovinyl arene blocks to the total block polymer being between about 10 and about 50 weight percent. Other block polymers which are suitable include hydrogenated derivatives of the above class wherein unsaturation has been reduced by hydrogenation, the unsaturation of block B having been reduced by at least about 50% of the unsaturation present in the non-hydrogenated block copolymer.

Still in accordance with the present invention, a method is provided for improving the bond strength and abrasion resistance of organic fibrous materials which comprises applying thereto a solution of the above classes of block copolymers in a solvent therefor and using a temperature during the impregnation with solution or subsequent to solvent removal therefrom which is enough above the glass transition temperature for the A-segments of the copolymer that formation of a coherent strong film of the polymer is formed in all parts of the system. If segment A is composed of polystyrene, the temperatures preferably are in the range of 100–140° C.

Again in accordance with the present invention, improved assemblies are provided wherein a fibrous organic material such as a textile or cord is impregnated or coated with the subject class of block copolymers and thereafter the treated article is bonded to an adjacent surface wherein the surface comprises a substantial proportion of a polymer having at least about 20% by weight of conjugated diene units.

The present invention contemplates a wide area of application wherein the fibrous organic material may be in the form of fabrics, textiles, woven or non-woven as the case may be, fibers, cords, threads, webbing netting, rope and filaments to produce an article exhibiting improved abrasion resistance, water repellence and bonding ability. While it is especially contemplated that the fibrous organic material is cellulosic in nature such as cotton, regenerated cellulose and the like, other textiles may be treated according to the present invention including natural or synthetic fibers such as jute, wool, and polymeric fibrous and textile materials such as nylon as well as mixtures of the same.

The block copolymers to be used in treating the fibrous articles have the general configuration

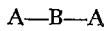

If the copolymer is not hydrogenated, the blocks A comprise poly(vinyl arene) blocks while the block B is a poly(conjugated diene) block. The blocks A normally have number average molecular weights, as determined by intrinsic viscosity measurements which have been correlated with primary molecular weight measurements including osometry and radiotracer measurements of tritium terminated polymer, of between about 8,000 and 45,000, while the conjugated diene polymer block has a number average molecular weight between about 25,000 and 150,000. If the copolymers are hydrogenated, the molecular weight ranges remain about the same. Two preferred species of such block copolymers include those having the block configuration polystyrene-polybutadiene-polystyrene and polystyrene-polyisoprene-polystyrene as well as their hydrogenated counterparts. The hydrogenated counterpart of the second of the above defined block copolymers is of special interest, not only because of its high stability but because of the elastomeric nature of the hydrogenated mid-section which resemles that of an ethylene-propylene rubber while the end blocks either remain as polyvinyl arene blocks or, if hydrogenated, become saturated blocks made up of polyvinylcyclohexane units. Thus, the fully hydrogenated preferred species has a block configuration which corresponds closely to polyvinylcyclohexane-[ethylene-propylene copolymer]-polyvinylcyclohexane.

Those particular block copolymers have the unique feature of attaining the stress-strain properties of an elastomer without the requirement that it be subjected to curing or vulcanization. Thus, they are sharply differentiated from other rubbers such as natural rubber, polybutadiene, SBR and the like which require vulcanization in order to attain satisfactory stress-strain properties.

The block copolymers of this invention may be the major polymeric material utilized in the treatment of the fibrous article but they may, if preferred, be modified by the presence of other components such as plasticizers or other polymeric coating materials. Plasticizers such as rubber extending mineral oils may be employed and polymers such as polystyrene, polyethylene, polypropylene and the like may be incorporated in minor amounts with the block copolymers.

The present invention contemplates the treatment of the fibrous article to an extent sufficient to improve the abrasion resistance and bond strength thereof, or at least to improve the water sensitivity thereof. Thus, in nonwoven fabrics, or in matted fibrous articles such as paper and paper products, it is possible to superficially treat the article with an amount of the block copolymer to provide a sizing effect with as little as about 0.2–2% by weight of the block copolymer. However, it is especially contemplated to utilize a minor amount in the order of 1–10% of the block copolymer based on the article to substantially improve the abrasion resistance thereof as well as other physical properties discused throughout this disclosure. The concept therefor includes a superficial treatment which may be referred to as "impregnation" by which is meant a treatment of an extent where the major amount of the block copolymer enters into the relatively porous fibrous material or surrounds the individual fibers without substantially blocking the interstices therebetween so as to provide a finished article exhibiting water repellence and improved abrasion resistance while at the same time the porosity of the article such as a textile is not materially reduced. Such impregnation is regarded as having taken place when the amount of block copolymer deposited on the fibrous article is in the order of between about 0.1 and 10% by weight of the treated article.

On the other hand, coatings may be formed by application of larger (e.g., up to about 25%) amounts of the block copolymers to the fibrous article which not only involves "impregnation" but also effects blocking of the interstices such as the openings in a textile to provide a virtually continuous surface thereupon resulting in an article having not only improved abrasion resistance and other features but also one wherein the porosity has been substantially reduced. By this is meant porosity to liquids but not necesarily to gaseous fluids, since it is one of the striking features of the present block copolymers that fluids such as air readily pentrate continuous films of the copolymer. This enables the treated articles to be utilized as wrappings for food products where protection is needed but "breathing" of the food wrapped therewith is also highly desirable.

The present invention contemplates among other end utilities the formation of tote boxes and the like wherein a relatively heavy textile such as burlap is impregnated and/or coated with an amount of the block copolymer modified or not with a normal thermoplastic such as polyethylene to provide increased stiffness and thereafter is formed by a suitable molding operation into a tote box or tray for the gathering of produce such as small fruits or vegetables and the like in the field and for their transport to wholesale and retail markets. Furthermore, the impregnation or coating of the textile allows for a subsequent and effective treatment of the textile with a conjugated diene containing polymer composition to provide still further heavy duty articles of commerce including belting, tires and tire components as well as other types of articles briefly outlined hereinbefore.

One of the problems involved in the formation of footwear comprising a textile (canvas) upper and a polymer containing sole composition has been the proper adherence of the several components. Sole compositions have been developed comprising block copolymer, polystyrene and a mineral extending oil. These compositions may be molded in the shape of a shoe sole or may be calendered or extruded to form a slab stock from which the shoe sole shape may be cut or stamped. The sole is then attached to an upper either by sewing or by direct molding operations in suitable machines. The attachment by a molding operation is desirable but often unsatisfactory due to lack of proper adhesion of the textile upper to the polymer-containing sole composition. It has been found that there is a remarkable and unexpected improvement in adhesion of the textile material to an adjacent material such as a conjugated diene polymer-containing shoe sole composition when the textile material has first been impregnated or coated with the block present invention. The reason for this is obscure but the benefit gained is clear in that adhesion is substantially improved and the resulting strength of the combined article is marked. The benefit is materially increased in that other properties are improved as well, particularly the abrasion resistance of the textile. Such abrasion resistance may be measured, for example, under the conditions of ASTM test D 1175–64T, generally referred to as a flexing and abrasion method, and utilizing a universal wear tester. The working examples given hereinafter will show that when utilizing canvas duck impregnated with 7–10% of the block copolymers the abrasion resistance is improved in the order of about 10–15 fold.

It is to be emphasized that these benefits are obtained without the necessity for a vulcanizing treatment of the block copolymer utilized as an impregnate or coating material. Of course, vulcanization may be utilized but this is unnecessary insofar as stress-strain properties are concerned. One of the striking features of the invention is the finding that the textile impregnated with unvulcanized block copolymer show exceptionally high bond strengths when attached by direct molding to vulcanized rubber compositions, such as shoe soling.

While the present invention does not depend upon the delineation of any particular scientific theory, a tentative explanation of the means by which the block copolymers of the present invention form thermoplastic elastomers may be useful. In the case of ordinary elastomers such as natural rubber, polyisoprene, polybutadiene, and random copolymers of styrene and butadiene, vulcanization results in chemical cross linking of polymer chains to form a network creating the desirable drastic increase in stress-strain properties required for the usual commercial applications of rubber. Contrary to this, however, the block copolymers of the present invention do not depend upon vulcanization and chemical cross links resulting therefrom for their surprisingly high stress-strain properties. On the contrary, they have these properties inherently built into them by the physical structure created apparently by the non-elastomeric blocks of monovinyl arene units which act as structural sites in place of the chemical cross links resulting from vulcanization. Thus, the block copolymers of the present invention have a decided economic and technical advantage over ordinary rubbers for use in the present instance in that vulcanization is not required and therefore manufacture of the articles of the invention is materially reduced. Moreover, the thermoplastic nature of the block copolymers enables their application to the textile or other fibrous material under such conditions that they are easily applied but then readily assume the character of a coating or impregnant having high stress-strain properties. Desirably, the block copolymers may be applied either in solution or as a melt. Consequently, a desirable means for applying the block copolymers would be to use solutions of the polymers in suitable solvents which may be halogenated solvents such as chlorofluoroethylene or the like or cycloaliphatic, aliphatic or aromatic solvents including cyclohexane, benzene, toluene, and mixtures thereof with alkanes or alkenes such as pentenes or pentanes, etc.

The following examples illustrate aspects of the present invention.

EXAMPLE I

A block copolymer was prepared having the general configuration polystyrene-polybutadiene-polystyrene, the block molecular weights being 14,000–72,000–14,000. All of the molecular weights referred to throughout the specification and claims are average figures determined by relationships between intrinsic viscosity and osmotic molecular weight. Solutions of the block copolymer were formed in chlorofluoroethylene, the solution containing from 2–15% by weight of polymer. The solutions were spread on untreated enameling duck cloth and air dried over night to form an impregnated duck exhibiting improved abrasion resistance, adhesion to block copolymer slabs and water repellence while maintaining porosity of the duck.

EXAMPLE II

The same block copolymer was utilized in the formation of cyclohexane cements which were employed for the impregnation of untreated enameling duck, the duck weighing 1.6 pounds per yard of 52 inches in width. The flexing and abrasion resistance of the impregnated duck which contained either 7 or 10% block polymer based on the weight of the duck was determined by ASTM method D 1175–64T utilizing a universal wear tester. Under a four pound loading, the number of cycles to break the standard specimen described by the ASTM method was in the order of 825 for duck impregnated with 7% block copolymer and about 1,000 for duck coated with 10% block copolymer. Compared with this, the same duck not so impregnated lasted only about 75 cycles to break under a four pound loading.

EXAMPLE III

Coatings of block copolymers on a number of different fabrics were effected by combining a hydrogenated block copolymer (100 parts, rubber extender naphthenic oil 25, parts and whiting 60 parts by weight) and thereafter pressing the composition into the fabric under pressed temperatures in the order of 5–30 tons for 10–30 minutes at 110–160° C. The block copolymer utilized originally had the structure polystyrene-polyisoprene-polystyrene but was fully hydrogenated prior to its use. The fabrics employed included canvas, glass cloth, mercerized cotton, a standard cotton fabric utilized for textile testing and a cotton print. Other coatings were obtained by calendering the polymer onto canvas to form coatings having .005–.01 inch of thickness which were completely waterproof and exhibited good adhesion to the fabric.

EXAMPLE IV

The same hydrogenated polymer was employed as a binder for a non-woven rayon fabric. The best results were obtained by drying the resulting impregnated fabric as temperatures between about 180 and 200° C.

EXAMPLE V

Canvas duck was impregnated with a block copolymer as described in Example I to form treated materials bearing 5 and 10% by weight of block copolymer. These treated materials (and an untreated sample for comparison) were laminated under 20 tons pressure for 4 minutes at 300° F. with a polyisoprene soling stock containing curatives and fillers. T-peel strengths were determined on the samples with the following results:

| Percent block polymer: | T-peel strength, p.l.i. |
|---|---|
| 0 | 8.8 |
| 5 | 12.2 |
| 10 | 13.4 |

I claim as my invention:

1. As a new article of manufacture a fibrous organic material bearing between about 0.1 and 10% by weight of the treated article of a block copolymer having the general configuration

A—B—A wherein each A is a polymer block of a monovinyl arene and B is a polymer block of a conjugated diene, each block A having an average molecular weight between about 8,000 and about 45,000, and block B having an average molecular weight between about 25,000 and about 150,000, such article exhibiting improved abrasion resistance, water repellance and bonding ability while at the same time the porosity of the article to air is not materially reduced.

2. An article of manufacture according to claim 1 wherein the block copolymer has the structure polystyrene-polybutadiene-polystyrene.

3. An article according to claim 1 wherein the fibrous material is a textile.

References Cited

UNITED STATES PATENTS

| 2,539,301 | 1/1951 | Foster | 117—126 X |
| 2,836,693 | 6/1958 | Fox | 117—161 X |
| 2,972,593 | 2/1961 | Daly | 117—161 X |
| 3,085,919 | 4/1963 | Clark | 117—126 X |
| 3,210,333 | 10/1965 | Strobel | 260—880 X |
| 3,299,174 | 1/1967 | Kuhre et al. | 260—880 X |
| 3,328,263 | 6/1967 | Huxtable et al. | 260—880 X |

WILLIAM D. MARTIN, Primary Examiner

MATHEW R. P. PERRONE, Jr., Assistant Examiner

U.S. Cl. X.R.

117—126, 138.8, 141, 143, 145, 155, 161; 260—880